Dec. 29, 1931.

J. H. SMITH

GAS REGULATING VALVE

Re. 18,307

Original Filed Aug. 1, 1927

Inventor

Jay H. Smith

By C. A. Snow & Co.

Attorneys.

Reissued Dec. 29, 1931 Re. 18,307

UNITED STATES PATENT OFFICE

JAY HARLEY SMITH, OF GLENDALE, CALIFORNIA, ASSIGNOR TO SUPERIOR REGULATOR CO., OF LOS ANGELES, CALIFORNIA

GAS REGULATING VALVE

Original No. 1,712,313, dated May 7, 1929, Serial No. 209,865, filed Aubust 1, 1927. Aplication for reissue filed March 25, 1931. Serial No. 525,285.

This invention relates to regulating valves especially designed for use in regulating the flow of gas to a burner to insure an even temperature at all times.

An important object of the invention is to provide a valve of this type which is automatic in its operation and one which may be readily adjusted to vary the volume of gas passing through the valve.

A still further object of the invention is to provide a valve of this type wherein a length of carbon is used as the expansible material, novel means being provided for connecting the valve and carbon to permit of adjustment of the valve with respect to the carbon.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawings.

Figure 1:
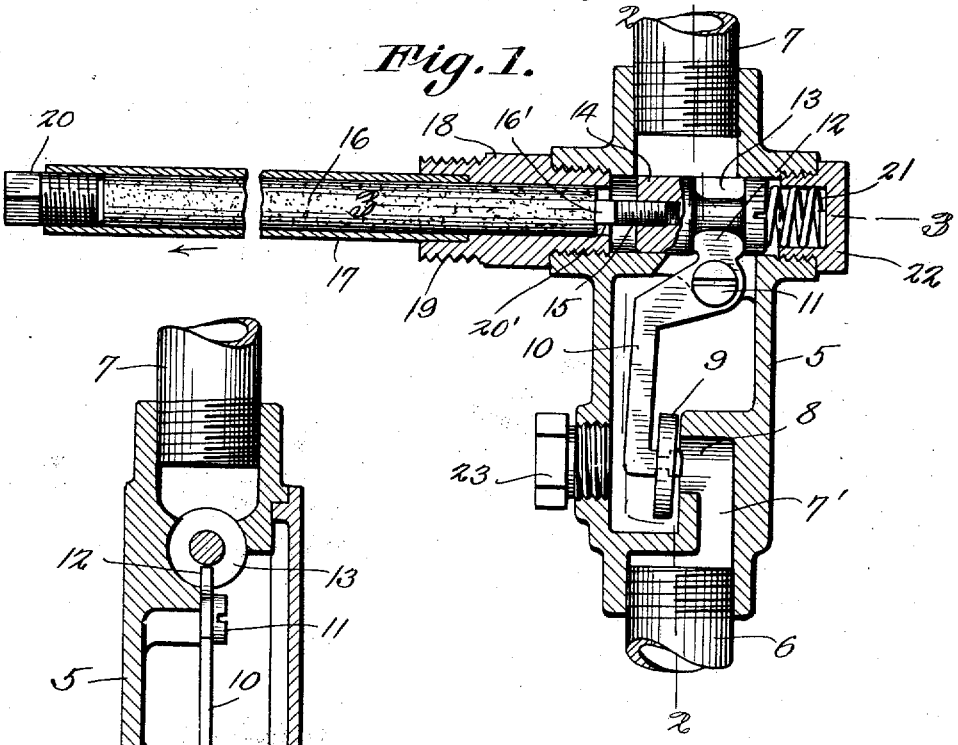
Fig. 1 is a longitudinal sectional view through a valve constructed in accordance with the invention.
Figure 2:
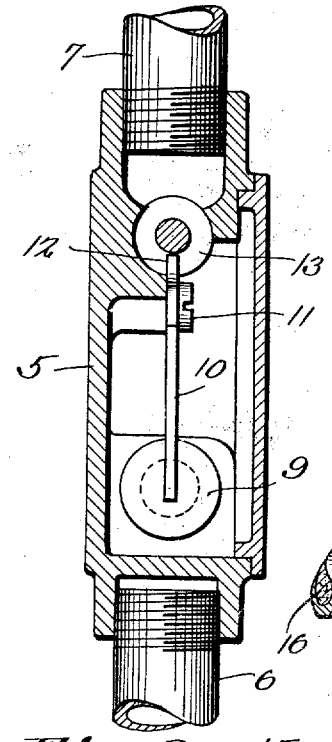
Fig. 2 is a sectional view taken on line 2—2 of Fig. 1.
Figure 3:
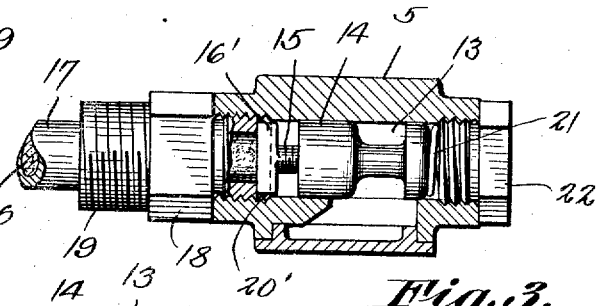
Fig. 3 is a sectional view taken on line 3—3 of Fig. 1.
Figure 4:
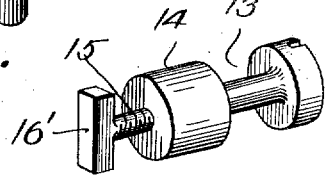
Fig. 4 is a perspective view of the adjusting member.

Referring to the drawings in detail, the reference character 5 indicates the body portion of the valve which is formed with internal threads disposed at its ends for the reception of the pipes 6 and 7 respectively.

The body portion is formed with a bore 7′ having a right angled inner extremity 8 against which the valve 9 seats in controlling the passage of gas through the valve body.

This valve 9 is mounted at one end of the arm 10 which is pivotally supported within the valve body as at 11, the arm having a head 12 adjacent to the pivot point thereof, which head seats in the groove 13 formed in the adjustable end member 14, the groove having curved surfaces corresponding to the shape of the head 12 so that the head may move within the groove to accomplish the movement of the arm 10.

The adjustable end or control member 14 is formed with a threaded bore to receive the threaded shank 15 of a valve operating member that has a head 16′ at its outer end, the head bearing against one end of the bar 16, which is preferably formed of carbon material. This bar 16 is positioned in the union 18 that screws into an opening formed in one side of the valve body, the union 18 being however provided with external threads 19 so that the device may be positioned in a threaded opening of a furnace wall, brooder or the like, or in such position that the tube 17 will be subjected to the heat of the oven or heating chamber in which the union is positioned.

The inner end of the union 18 is provided with a notch 20′ into which the head 16′ extends to hold the head and shank against rotation when the member 14 is being adjusted.

In order that the bar 16 may be removed, and replaced, a plug 20 is provided at one end of the copper tube 17, which plug may be removed, allowing access to the bar 16.

The adjustable end member 14 is provided with a groove to receive a screw driver or similar instrument whereby the end member may be rotated with respect to the threaded shank 15 to adjust the arm 10 to cause the valve 9 to be held in predetermined spaced relation with the valve seat formed at the end of the bore 8.

Contacting with the end member 14 is a coiled spring 21 which is fitted within the cap 22 so that the spring will hold the end member under tension at all times and insure a close contact between the bar 16 and the head 16′.

A threaded plug indicated at 23 closes an opening disposed adjacent the valve 9 so that access may be had to the valve 9 should it be desired to repair the same. It is apparent that the opening closed by the plug 23 might be made of such size that the valve 9 could be entirely removed from the housing.

In the use of the device it will be seen that with the valve 9 set in a manner as shown by Fig. 1, gas will pass through the pipes 6 and 7 to a burner heating an oven or heat chamber of a brooder, in which the tube 17 and bar 16 are positioned.

It is obvious that as the temperature rises in the oven or heating chamber, the tube 17 which is constructed of copper and having a greater co-efficiency of expansion than the carbon bar 16, will expand, lengthening the tube, whereupon the spring 21 will act to move the carbon bar 16 in the direction of the arrow as indicated by Fig. 1 and moving the valve 9 to cut off, to a degree, the volume of gas passing to the burner.

Should the oven or heating chamber cool, it is obvious that the copper tube 17 will contract, forcing the carbon bar 16 in the opposite direction to move the arm 10 causing the valve 9 to be unseated to admit more gas to the valve body and to the burner supplied with gas through the valve body.

Having thus described my invention, I claim:

In a thermostatically controlled valve, a valve housing through which gas passes, an arm pivotally mounted in the valve housing, a valve member on one end of the arm for controlling the passage of gas through the valve housing, said valve housing having lateral openings, a union positioned in one of said openings, a tube extending into the union, a bar fitted in the tube and adapted to move upon expansion and contraction of the tube, said union having a notch formed in one end thereof, a threaded member having a head fitted in the notch and engaging one end of the bar, an adjustable member connected with the threaded member to be moved by the movement of the bar, a coiled spring for normally urging the adjustable member in one direction and said valve carrying arm having connections with the adjustable member to move the arm and valve.

In testimony whereof, I hereunto affix my signature.

JAY HARLEY SMITH.